(12) United States Patent
Lee

(10) Patent No.: US 8,648,960 B2
(45) Date of Patent: Feb. 11, 2014

(54) DIGITAL PHOTOGRAPHING APPARATUS AND CONTROL METHOD THEREOF

(75) Inventor: Jae-myung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 13/170,259

(22) Filed: Jun. 28, 2011

(65) Prior Publication Data
US 2012/0057067 A1 Mar. 8, 2012

(30) Foreign Application Priority Data
Sep. 7, 2010 (KR) .................. 10-2010-0087666

(51) Int. Cl.
*G03B 13/00* (2006.01)
*H04N 5/222* (2006.01)
*G06K 9/00* (2006.01)

(52) U.S. Cl.
USPC ......................... 348/345; 348/347; 382/118

(58) Field of Classification Search
USPC .......... 348/345, 347; 382/103, 107, 118, 254
See application file for complete search history.

(56) References Cited

U.S. PATENT DOCUMENTS

| | | | |
|---|---|---|---|
| 7,801,432 B2* | 9/2010 | Kumagai | 396/79 |
| 2008/0118156 A1* | 5/2008 | Okada | 382/195 |
| 2009/0015681 A1* | 1/2009 | Pipkorn | 348/208.12 |
| 2009/0316016 A1* | 12/2009 | Iwamoto | 348/222.1 |

* cited by examiner

*Primary Examiner* — Lin Ye
*Assistant Examiner* — Mekonnen Dagnew
(74) *Attorney, Agent, or Firm* — Drinker Biddle & Reath LLP

(57) ABSTRACT

Embodiments include a digital photographing apparatus and a control method thereof. The digital photographing apparatus detects two or more face regions from an input image, calculates an aperture value for focusing on all face regions to notify a user of the calculated value, and photographs all focused faces by automatically changing the aperture value, when the subject to be photographed is a plurality of persons.

20 Claims, 8 Drawing Sheets

FIG. 3

| 18-55mm F3.5-5.6 | | | | | | | | | | | | | | | | | | |
|---|---|---|---|---|---|---|---|---|---|---|---|---|---|---|---|---|---|---|
| | 18.55 | 19.17 | 20.48 | 21.88 | 23.38 | 24.97 | 26.68 | 28.50 | 30.45 | 32.53 | 34.75 | 37.13 | 39.66 | 42.37 | 45.27 | 48.36 | 51.66 | 53.40 |
| RETENTION VALUE a | 60 | 60 | 58 | 56 | 56 | 55 | 55 | 53 | 52 | 51 | 49 | 48 | 46 | 44 | 42 | 40 | 38 | 37 |
| RETENTION VALUE b | 52533 | 53600 | 55467 | 56933 | 58000 | 59600 | 61200 | 63867 | 66400 | 69333 | 72933 | 76533 | 80800 | 85333 | 90133 | 95200 | 100400 | 102933 |

FIG. 4

| 18-55mm F3.5-5.6 | | | | | | | | | | | | | | | | | | |
|---|---|---|---|---|---|---|---|---|---|---|---|---|---|---|---|---|---|---|
| | 18.55 | 19.17 | 20.48 | 21.88 | 23.38 | 24.97 | 26.68 | 28.50 | 30.45 | 32.53 | 34.75 | 37.13 | 39.66 | 42.37 | 45.27 | 48.36 | 51.66 | 53.40 |
| hf | 389 | 382 | 373 | 366 | 358 | 349 | 338 | 326 | 313 | 298 | 281 | 262 | 242 | 220 | 197 | 172 | 147 | 133 |
| 0.28m | 628 | 626 | 623 | 620 | 617 | 614 | 611 | 608 | 604 | 601 | 597 | 592 | 588 | 582 | 576 | 569 | 561 | 557 |

FIG. 5

Focal Length : 18mm

| Distance (meters) | f/1.4 Near | f/1.4 Far | f/2 Near | f/2 Far | f/2.8 Near | f/2.8 Far | f/4 Near | f/4 Far | f/5.6 Near | f/5.6 Far | f/8 Near | f/8 Far | f/11 Near | f/11 Far | f/16 Near | f/16 Far | f/22 Near | f/22 Far | f/32 Near | f/32 Far |
|---|---|---|---|---|---|---|---|---|---|---|---|---|---|---|---|---|---|---|---|---|
| 0.25 | 0.25 | 0.26 | 0.24 | 0.26 | 0.24 | 0.26 | 0.24 | 0.27 | 0.23 | 0.27 | 0.22 | 0.28 | 0.22 | 0.30 | 0.20 | 0.32 | 0.19 | 0.32 | 0.17 | 0.46 |
| 0.5 | 0.48 | 0.52 | 0.47 | 0.53 | 0.46 | 0.55 | 0.45 | 0.57 | 0.43 | 0.60 | 0.40 | 0.66 | 0.37 | 0.75 | 0.34 | 0.95 | 0.30 | 1.53 | 0.26 | 10.4 |
| 0.75 | 0.70 | 0.80 | 0.69 | 0.82 | 0.67 | 0.86 | 0.64 | 0.92 | 0.60 | 1.01 | 0.55 | 1.17 | 0.50 | 1.53 | 0.44 | 2.71 | 0.37 | ∞ | 0.31 | ∞ |
| 1 | 0.92 | 1.09 | 0.89 | 1.14 | 0.85 | 1.21 | 0.80 | 1.32 | 0.74 | 1.52 | 0.67 | 1.94 | 0.59 | 3.18 | 0.51 | 33.2 | 0.42 | ∞ | 0.34 | ∞ |
| 1.5 | 1.33 | 1.72 | 1.27 | 1.84 | 1.19 | 2.02 | 1.10 | 2.37 | 0.99 | 3.11 | 0.87 | 5.59 | 0.74 | ∞ | 0.61 | ∞ | 0.49 | ∞ | 0.38 | ∞ |
| 2 | 1.70 | 2.42 | 1.61 | 2.65 | 1.49 | 3.06 | 1.34 | 3.92 | 1.18 | 6.50 | 1.01 | 94 | 0.84 | ∞ | 0.68 | ∞ | 0.53 | ∞ | 0.41 | ∞ |
| 2.5 | 2.05 | 3.19 | 1.91 | 3.60 | 1.74 | 4.41 | 1.55 | 6.46 | 1.34 | 18.8 | 1.12 | ∞ | 0.91 | ∞ | 0.72 | ∞ | 0.56 | ∞ | 0.42 | ∞ |
| 3 | 2.38 | 4.06 | 2.19 | 4.75 | 1.97 | 6 | 1.73 | 11.4 | 1.47 | ∞ | 1.21 | ∞ | 0.97 | ∞ | 0.76 | ∞ | 0.58 | ∞ | 0.44 | ∞ |
| 3.5 | 2.68 | 5.03 | 2.45 | 6.14 | 2.18 | 8.93 | 1.88 | 25.0 | 1.58 | ∞ | 1.29 | ∞ | 1.02 | ∞ | 0.79 | ∞ | 0.60 | ∞ | 0.44 | ∞ |
| 4 | 2.97 | 6.13 | 2.68 | 7.87 | 2.36 | 13.1 | 2.02 | 238 | 1.67 | ∞ | 1.35 | ∞ | 1.06 | ∞ | 0.81 | ∞ | 0.61 | ∞ | 0.45 | ∞ |
| 4.5 | 3.23 | 7.39 | 2.90 | 10.1 | 2.52 | 20.7 | 2.14 | ∞ | 1.75 | ∞ | 1.40 | ∞ | 1.09 | ∞ | 0.83 | ∞ | 0.62 | ∞ | 0.46 | ∞ |
| 5 | 3.48 | 8.85 | 3.10 | 13.0 | 2.67 | 38.4 | 2.24 | ∞ | 1.83 | ∞ | 1.44 | ∞ | 1.12 | ∞ | 0.84 | ∞ | 0.63 | ∞ | 0.46 | ∞ |
| 5.5 | 3.72 | 10.5 | 3.28 | 17.0 | 2.81 | 128 | 2.34 | ∞ | 1.89 | ∞ | 1.48 | ∞ | 1.14 | ∞ | 0.86 | ∞ | 0.64 | ∞ | 0.46 | ∞ |
| 6 | 3.94 | 12.6 | 3.45 | 22.9 | 2.93 | ∞ | 2.42 | ∞ | 1.94 | ∞ | 1.52 | ∞ | 1.16 | ∞ | 0.87 | ∞ | 0.64 | ∞ | 0.47 | ∞ |
| 8 | 4.71 | 26.4 | 4.03 | 54.9 | 3.34 | ∞ | 2.69 | ∞ | 2.11 | ∞ | 1.62 | ∞ | 1.22 | ∞ | 0.90 | ∞ | 0.66 | ∞ | 0.48 | ∞ |
| 10 | 5.34 | 78 | 4.48 | ∞ | 3.65 | ∞ | 2.89 | ∞ | 2.23 | ∞ | 1.69 | ∞ | 1.25 | ∞ | 0.92 | ∞ | 0.67 | ∞ | 0.48 | ∞ |
| 15 | 6.50 | ∞ | 5.26 | ∞ | 4.15 | ∞ | 3.19 | ∞ | 2.41 | ∞ | 1.79 | ∞ | 1.31 | ∞ | 0.95 | ∞ | 0.68 | ∞ | 0.49 | ∞ |
| 20 | 7.29 | ∞ | 5.77 | ∞ | 4.46 | ∞ | 3.37 | ∞ | 2.51 | ∞ | 1.84 | ∞ | 1.34 | ∞ | 0.96 | ∞ | 0.69 | ∞ | 0.49 | ∞ |
| 30 | 8.29 | ∞ | 6.38 | ∞ | 4.81 | ∞ | 3.57 | ∞ | 2.62 | ∞ | 1.90 | ∞ | 1.37 | ∞ | 0.98 | ∞ | 0.70 | ∞ | 0.50 | ∞ |
| 50 | 9.32 | ∞ | 6.97 | ∞ | 5.14 | ∞ | 3.75 | ∞ | 2.71 | ∞ | 1.95 | ∞ | 1.39 | ∞ | 0.99 | ∞ | 0.71 | ∞ | 0.50 | ∞ |
| ∞ | 11.5 | ∞ | 8.12 | ∞ | 5.75 | ∞ | 4.07 | ∞ | 2.88 | ∞ | 2.04 | ∞ | 1.45 | ∞ | 1.03 | ∞ | 0.73 | ∞ | 0.52 | ∞ |
| Hyperfocal Distance | 11.5 | | 8.12 | | 5.75 | | 4.07 | | 2.88 | | 2.04 | | 1.45 | | 1.03 | | 0.73 | | 0.52 | |

Circle of confusion : 0.02mm

DIGITAL PHOTOGRAPHING APPARATUS AND CONTROL METHOD THEREOF

CROSS-REFERENCE TO RELATED PATENT APPLICATION

This application claims the priority benefit of Korean Patent Application No. 10-2010-0087666, filed on Sep. 7, 2010, in the Korean Intellectual Property Office, the disclosure of which is incorporated herein in its entirety by reference.

BACKGROUND

1. Field of the Invention

Embodiments relate to a digital photographing apparatus and a control method thereof.

2. Description of the Related Art

Most digital cameras have an auto-focus (AF) function that focuses on a subject to be photographed to obtain a good photo. Particularly, an AF function that focuses on a face solves a limitation that an image of a person to be photographed is blurredly captured because the person to be photographed is not focused and another subject such as a landscape is focused instead. The AF function that focuses on a face recognizes the face of a subject through picture recognition processing and performs AF processing in order for the location of the recognized face to be focused.

When a subject is more than one person, a degree of focusing varies according to the location of the subject by an aperture value that a user has set, and thus the user frequently photographs an unfocused photo without even recognizing the various degree of focusing.

SUMMARY

Embodiments include a digital photographing apparatus and a control method thereof, which detect a face of a subject, automatically calculate an aperture value for focusing on all faces of a plurality of faces to notify a user of the calculated value, and photograph all focused faces by automatically changing the aperture value, when the subject to be photographed is a plurality of persons.

According to an embodiment, a method of controlling a digital photographing apparatus includes: detecting two or more face regions from an input image; calculating distances to subjects corresponding to the detected face regions; determining whether to enable depth expression of the input image based on the calculated distances; and controlling capturing of the input image according to the determined result.

Controlling capturing may include changing an aperture value for capturing the input image.

Calculating distances may include calculating the distances to the subjects by using auto-focus (AF) values for the detected face regions, and determining whether to enable depth expression may include comparing a depth value, based on a distance difference between a distance to a subject corresponding to a focused face region among the detected face regions and a distance to a subject corresponding to a farthest face region, and a depth value based on a predetermined aperture value.

Determining whether to enable depth expression may include: calculating a first depth value which is a depth difference value based on the calculated distance; and comparing the calculated first depth value and a second depth value based on a predetermined aperture value.

Controlling capturing may include outputting an alarm message indicating that depth expression of the input image cannot be performed, when the first depth value is greater than the second depth value.

Controlling capturing may include: changing to an aperture value corresponding to the first depth value when the first depth value is greater than the second depth value; and capturing the input image with the changed aperture value.

Controlling capturing may include: determining whether to change to an aperture value corresponding to the first depth value when the first depth value is greater than the second depth value; and capturing the input image using the predetermined aperture value or the changed aperture value according to a user's selection.

The method may further include selecting a largest first face region and a smallest second face region from among the detected face regions, wherein controlling capturing may include calculating a distance to a subject corresponding to the first face region, and a distance to a subject corresponding to the second face region.

The method may further include comparing a size of a focused first face region among the detected face regions and sizes of other face regions; and capturing the input image using a predetermined aperture value when a difference between the size of the first face region and the sizes of the other face regions is equal to or greater than a first critical value.

The method may further include changing a depth value in proportion to sizes of the detected face regions when a distance to a subject corresponding to the detected face regions is equal to or less than a first critical value.

The method may further include selecting one of aperture value auto change function on, aperture value auto change function off, and aperture value auto change function guide according to a user's selection.

According to another embodiment, a non-transitory computer readable storage medium may have stored thereon a computer program executable by a processor for performing the method of controlling a digital photographing apparatus.

According to another embodiment, a digital photographing apparatus includes: a face detection unit that detects two or more face regions from an input image; an auto-focus (AF) calculation unit that calculates distances to subjects corresponding to the detected face regions; and a control unit that determines whether to enable depth expression of the input image on the basis of the calculated distances, and controls capturing of the input image according to the determined result.

The AF calculation unit may calculate the distances to the subjects by using AF values for the detected face regions, and the control unit may change an aperture value for capturing the input image.

The control unit may calculate a first depth value which is a depth difference value based on the calculated distance, compare the calculated first depth value and a second depth value based on a predetermined aperture value, and control photographing of the input image according to the compared result.

The digital photographing apparatus may further include an alarm unit that outputs whether to enable depth expression of the input image, wherein the alarm unit may output an alarm message indicating that depth expression of the input image cannot be performed according to control of the control unit, when the first depth value is greater than the second depth value.

When the first depth value is greater than the second depth value, the control unit may change to an aperture value corresponding to the first depth value, and facilitate the input image to be captured using the changed aperture value.

When the first depth value is greater than the second depth value, the control unit may determine whether to change to an aperture value corresponding to the first depth value, and facilitate the input image to be captured using the predetermined aperture value or the changed aperture value according to a user's selection.

The control unit may select a largest first face region and a smallest second face region from among the detected face regions, and calculate a distance to a subject corresponding to the first face region and a distance to a subject corresponding to the second face region.

The digital photographing apparatus may further include a user mode selection unit that selects one of aperture value auto change function on, aperture value auto change function off, and aperture value auto change function guide.

BRIEF DESCRIPTION OF THE DRAWINGS

The above and other features and advantages will become more apparent by describing in detail exemplary embodiments with reference to the attached drawings in which:

FIGS. 3 and 4 are exemplary diagrams for describing a method which calculates a distance to a subject with an AF value, according to an embodiment;

FIG. 5 is an exemplary diagram for describing a method which determines whether to enable depth expression with a distance to a subject, according to an embodiment;

DETAILED DESCRIPTION

Figure 1:
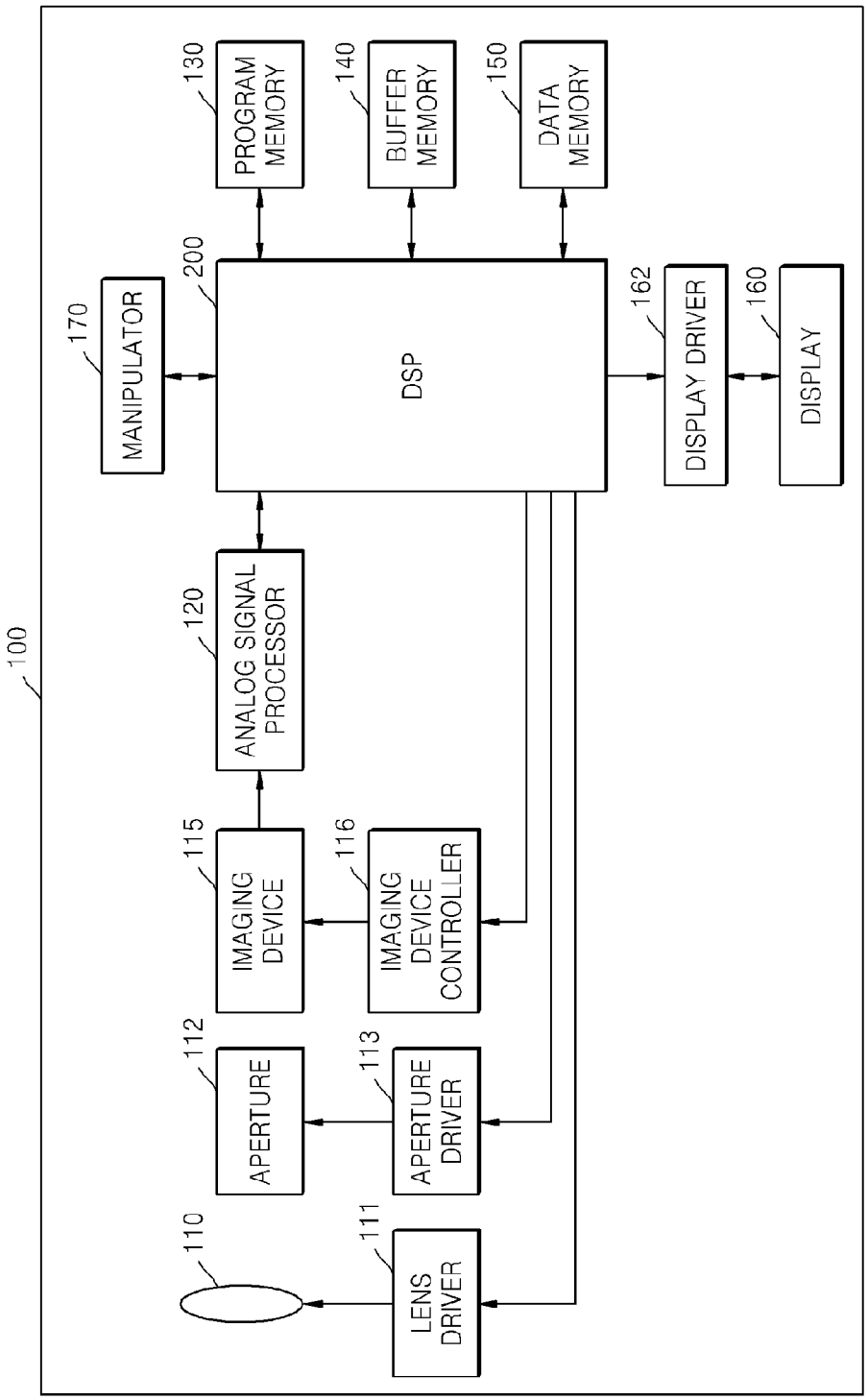
FIG. 1 is a block diagram that illustrates a schematic structure of a digital image processing apparatus, according to an embodiment.

Embodiments may be variously modified and have several embodiments, and thus exemplary embodiments are illustrated in the accompanying drawings and will be described in detail through a detailed description. However, this should not be construed as limiting, and it is understood that modifications, equivalents and variations of the embodiments are included in the scope and spirit of the invention as defined by the following claims. In the following description, when the detailed description of the relevant known function or configuration is determined to unnecessarily obscure important points of the embodiments, the detailed description will be omitted.

The terminology used herein is for the purpose of describing particular embodiments only and is not intended to be limiting of example embodiments.

Exemplary embodiments will now be described more fully with reference to the accompanying drawings, in which the exemplary embodiments are shown. Like reference numerals in the drawings denote like elements, and thus their repetitive description will be omitted.

FIG. 1 is a block diagram that illustrates a schematic structure of a digital image processing apparatus, according to an embodiment.

As the digital image processing apparatus according to the present embodiment, a digital camera 100 will be described below. However, the digital image processing apparatus is not limited to the digital camera 100, and it may be applied to digital devices such as camera phones, Personal Digital Assistants (PDAs) and Portable Multimedia Players (PMPs).

The digital camera 100 according to the present embodiment may include a lens unit 110, a lens driver 111, an aperture 112, an aperture driver 113, an imaging device 115, an imaging device controller 116, an analog signal processor 120, a program memory 130, a buffer memory 140, a data memory 150, a display driver 162, a display 160, a digital signal processor 200, and a manipulator 170. Herein, the lens unit 110, the lens driver 111, the aperture 112, the aperture driver 113, the imaging device 115, the imaging device controller 116 and the analog signal processor 120 may be collectively referred to as an imaging unit.

The lens unit 110 directs an optical signal. The lens unit 110 may include a zoom lens for narrowing or broadening an angle of view in proportion to a focal length, and a focus lens for focusing on a subject. The zoom lens and the focus lens may be configured as one lens, but they may be configured as a group of lenses.

The aperture 112 controls a degree of opening/shutting of the aperture 112 to control the amount of incident light.

The lens driver 111 and the aperture driver 113 receive a control signal from the digital signal processor 200 and respectively drive the lens unit 110 and the aperture 112. The lens driver 111 controls the location of a lens to control a focal length, and performs an auto-focus operation, a zooming operation and a focal drift operation. The aperture driver 113 controls a degree of the opening/shutting of the aperture 112, and particularly, the aperture driver 113 controls an f-number or an aperture value to perform an auto-focus operation, an auto exposure correction operation, a focal drift operation and a depth of field control operation. In an embodiment, when a plurality of faces are detected, the digital camera 100 determines whether a depth of a subject may be expressed with a predetermined f-number or aperture value according to a distance to each face region, and the digital camera 100 informs a user of the determined result or performs auto change to an aperture value enabling auto depth expression and facilitates the faces to be photographed.

An optical signal transmitted through the lens unit 110 forms the image of a subject in a light-receiving surface of the imaging device 115 that the optical signal reaches. The imaging device 115 may use a Charge-Coupled Device (CCD), a Complementary Metal-Oxide Semiconductor Image Sensor (CIS) or a high-speed image sensor that converts an optical signal into an electrical signal. The sensitivity of the imaging device 115 may be controlled by the imaging device controller 116. The imaging device controller 116 may control the imaging device 115 according to a control signal that is automatically generated by an image signal inputted in real time or a control signal that is manually inputted by manipulation of a user.

The exposure time of the imaging device 115 is controlled by a shutter (not shown). As the shutter, there may be a mechanical shutter that controls the input of light by moving a shade or an electronic shutter that provides an electrical signal to control exposure.

The analog signal processor 120 performs a noise reduction processing operation, a gain control operation, a waveform standardizing operation and an analog-to-digital converting operation on an analog signal provided from the imaging device 115.

The manipulator 170 may receive a control signal from a user or the outside. The manipulator 170 may include a shutter-release button for inputting a shutter-release signal that exposes the imaging device 115 to light for a predetermined time to take a picture, a power button for inputting a control signal that controls turning-on/off of a power source, a wide zoom button and a telephoto zoom button for broadening or narrowing an angle of view according to an input, and various function buttons for selecting modes such as a character input mode, a photographing mode, and a replay mode, selecting a white balance setting function, and selecting an exposure setting function. The manipulator 170 may include the above-described buttons, but the manipulator 170 is not limited thereto. As another example, the manipulator 170 may be implemented as an arbitrary type manipulator, which enables a user's input, such as a keyboard, a touch pad, a touch screen, or a remote controller.

Moreover, in an embodiment, a user may set a aperture value auto change menu, for example, aperture value auto change on, aperture value auto change off, and aperture value auto change guide, through the manipulator 170. Herein, the on/off setting is for whether to auto change or not, and the guide setting shows a guide for a depth value to the user in photographing and outputs a guide message, for example, a message indicating change to an aperture value (8.0), when an aperture value is required to be changed according to the depth value in photographing.

The digital camera 100 includes the program memory 130 that stores an operating system for driving the digital camera 100 and programs of the operating system, the buffer memory 140 that temporarily stores data required while an operation is being performed or result data, and the data memory 150 that stores an image file including image signals, and various information necessary for the programs.

Furthermore, the digital camera 100 includes the display 160 that displays the operating state of the digital camera 100 and image information which is photographed by the digital camera 100. The display 160 may provide visual information and acoustic information to a user. For providing visual information, for example, the display 160 may be configured with a Liquid Crystal Display (LCD) or an organic light-emitting display panel. The display driver 162 provides a driving signal to the display 160.

The digital camera 100 includes the digital signal processor 200 that processes an input image signal and controls each element according to the input image signal or an external input signal. The digital signal processor 200 may reduce noise of input image data, and perform image signal processing such as gamma correction, color filter array interpolation, color matrix, color correction, and color enhancement. Also, the digital signal processor 200 may compress image data, which is generated through image signal processing for improvement of image quality, to generate an image file, or may restore the image data from the image file. An image compression type may be a reversible type or an irreversible type. As an example of a suitable type, there is a Joint Photographic Experts Group (JPEG) type or a JPEG 2000 type. Compressed data may be stored in the data memory 150. Also, the digital signal processor 200 may perform unclearness processing, color processing, blur processing, edge emphasis processing, image analysis processing, image recognition processing, and image impact processing. As image recognition processing, the digital signal processor 200 may perform face recognition processing and scene recognition processing. For example, the digital signal processor 200 may perform brightness level control, color correction, contrast control, outline emphasis processing, screen division processing, generation of an image such as a character image, and combination processing of images.

Moreover, the digital signal processor 200 executes a program that is stored in the program memory 130, or includes a discrete module, and generates a control signal for controlling auto focusing, zooming, focal drift and auto exposure correction. The digital signal processor 200 provides the control signal to the lens driver 111, the aperture driver 113, and the imaging device controller 116, and may control overall operations of elements, which are included in the digital camera 100, such as a shutter or a flash.

Figure 2:
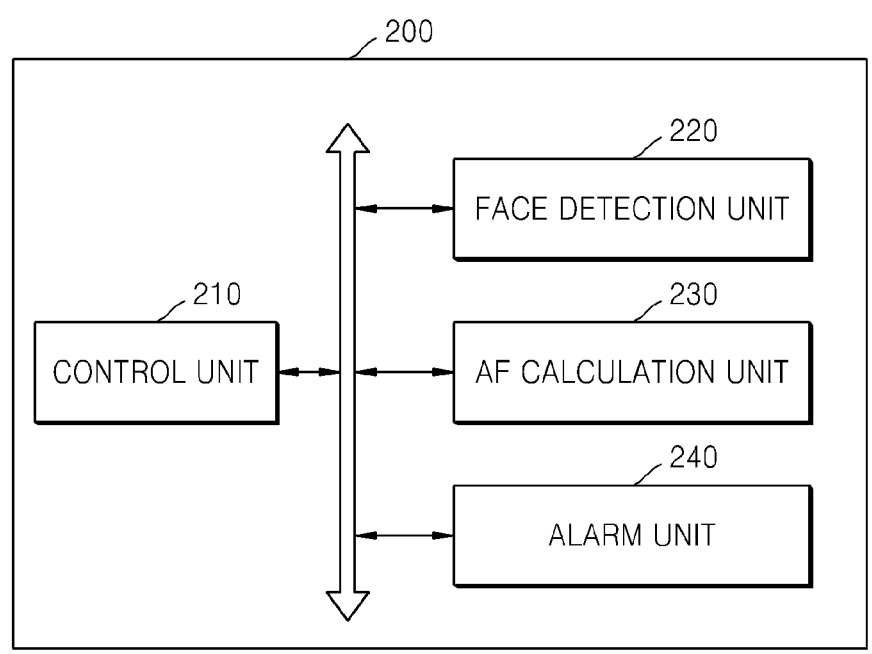
FIG. 2 is a detailed block diagram that illustrates a digital signal processor, according to an embodiment.

FIG. 2 is a detailed block diagram that illustrates the digital signal processor 200, according to an embodiment.

Referring to FIG. 2, the digital signal processor 200 includes a control unit 210, a face detection unit 220, an AF calculation unit 230, and an alarm unit 240. Herein, it should be understood that the digital signal processor 200 is the same as a digital photographing device that is recited in the following claims.

The control unit 210 controls overall operation of the digital signal processor 200.

The face detection unit 220 detects a face region from an image that is inputted through the imaging device 115. Particularly, the face detection unit 220 detects all faces that exist in the input image. Specifically, the face detection unit 220 detects a region having a face feature, for example, a region having a skin color, a region having pupils, and a region having a face shape, as a face region. For a face region detection technique and algorithm, many technologies exist and may be used for face detection according to an embodiment. For example, the face detection unit 220 may detect a face region by using a motion vector technique, a feature point detection technique and an Adaboost learning technique.

The AF calculation unit 230 performs auto focusing on the face region that is detected by the face detection unit 220. Herein, the AF calculation unit 230 performs AF processing in a contrast detection scheme, but may perform AF processing in other schemes, for example, AF processing by pan focus or phase difference AF processing. Herein, AF based on the contrast detection scheme moves a focus lens to an AF region that is determined for executing AF, i.e., a focus lens location where the contrast values of detected face regions are the highest. This is a scheme that moves the focus lens, converts the contrast of the imaging device 115 (for example, contrast of a CCD) at the moment that the contrast values of detected face regions are the highest into an electrical signal, analyzes the waveform of the signal, fits the focus lens in a lens location where a high frequency component is the maximum, and focuses a focal point. Also, the AF calculation unit 230 calculates a distance to subjects corresponding to respective face regions by using AF values for the respective face regions, i.e., a focus lens location value. Herein, the AF calculation unit 230 calculates the distance to the subject, but that should not be construed as limiting. It is apparent that the control unit 210 may calculate the distance to the subject. Moreover, as described above, the AF calculation unit 230 may perform an AF calculation on all face regions that exist in an input image, and calculate respective distances. Alternatively, the AF calculation unit 230 may perform an AF calculation on the largest face region and the smallest face region and calculate respective distances. A method that calculates a distance to a subject by using an AF value will be described below with reference to FIGS. 3 and 4.

FIGS. 3 and 4 are exemplary diagrams for describing a method which calculates a distance to a subject with an AF value, according to an embodiment. A method that calculates a distance using contrast AF will be described below with reference to FIGS. 3 and 4.

A distance to a subject may be calculated through Equation (1).

$$\text{distance} = B/(\text{current focal location} - \text{finite focal location}) + A \quad (1)$$

where A is a retention value "a" of FIG. 3, B is a retention value "b" of FIG. 3, and respective retention values are values that are determined on the basis of lens setting information.

A distance to a subject may be calculated by applying the values of FIGS. 3 and 4 to Equation (1).

To provide a description on the wide angle end (i.e., 18 mm) of the 18-55 mm lens as an example, B is 52533 mm and A is 60 mm, in FIG. 3. The current focal location denotes the number of steps that are read from a lens according to an AF result. For example, if the current focal location is 500, a distance to a subject is as follows.

$$\text{distance} = 52533/(500-389) + 60 \approx 533.27 \text{ mm}$$

A distance to each subject may be calculated using Equation (1) and FIGS. 3 and 4. In an embodiment, a distance to a subject is calculated using an AF value, but that should not be construed as limiting. It is apparent that a distance to a subject may be calculated in another scheme. For example, a distance to a subject may be calculated using the number of pixels in a detected face, a CCD size, a lens focal length, and a pre-stored face size.

The control unit 210 determines whether to enable the depth expression of an input image by using a distance to a subject. The control unit 210 controls photographing of the input image according to the determined result. Herein, enabling or disabling depth expression denotes whether an entire input image may be focused with a current aperture value, i.e., the amount of received light.

Generally, in a subject other than a focal point, being blurred denotes that a depth is shallow, but besides the focal point, clearly being photographed denotes that a depth is deep. An aperture value is a value for controlling the amount of received light. As an aperture is increasingly opened, the aperture value allows much light to be transmitted. As the aperture is increasingly closed, the aperture value allows little light to be transmitted. That is, as the aperture is increasingly opened, a depth becomes shallower, and thus an out-focusing effect can be obtained. On the other hand, as the aperture is increasingly closed, a completely-focused photo can be obtained. Also, as a subject is closely photographed or a distance between backgrounds increases, a depth is shallow.

The control unit 210 determines whether a range enables depth expression or not through a distance between a currently-set f-number and a subject, and controls photographing of an input image. The relationship between an f-number, i.e., an aperture value and a distance to a subject will be described below with reference to FIG. 5.

FIG. 5 is an exemplary diagram for describing a method which determines whether to enable depth expression with a distance to a subject, according to an embodiment. Referring to FIG. 5, a table for a depth of field is shown when a focal length is 18 mm. For example, when a current aperture value is f/2 and a distance to a left subject is 2.5 m, it can be seen that depth expression may be performed from 1.91 m being the nearest distance to 3.6 m being the longest distance. The control unit 210 calculates a first depth value that is a depth difference value based on a calculated distance. That is, the control unit 210 calculates a depth difference value based on a distance to each subject, and compares the first depth value and a second depth value based on a currently-set aperture value. When the first depth value is greater than the second depth value, the control unit 210 determines that it is impossible to perform depth expression of an input image with the currently-set aperture value. In this case, the alarm unit 240 outputs an alarm message indicating that it is impossible to perform the depth expression of an input image with the currently-set aperture value. Alternatively, when the first depth value is greater than the second depth value, the control unit 210 may change the currently-set aperture value to an aperture value corresponding to the first depth value and allow an input image to be captured with the changed aperture value. For example, when a distance difference value to a subject is 533.27 mm, the control unit 210 may automatically change an aperture value to f/4 that is an aperture value enabling depth expression for a distance difference and allow an input image to be captured.

Alternatively, when the first depth value is greater than the second depth value, the control unit 210 confirms whether to change a predetermined aperture value to an aperture value corresponding to the first depth value to a user, and the control unit 210 may allow photographing to be performed with the predetermined aperture value or the changed aperture value according to the user's selection.

In the above-described embodiments, the digital camera 100 calculates an AF value for an entire input image, measures a distance to a subject, and determines whether to change an aperture value. However, the digital camera 100 may optionally measure a distance with the size of a detected face and determine whether to change an aperture value.

The control unit 210 selects the largest first face region and the smallest second face region from among detected face regions. Herein, a face size may be determined with the number of pixels of face regions.

The AF calculation unit 230 calculates the above-described AF values for the first and second face regions and calculates a distance to a subject. The control unit 210 compares depth expression difference values by distance and a depth value enabling expression with a currently-set aperture value to determine whether to enable depth expression.

Moreover, when a plurality of detected face regions are in a near distance, the control unit 210 may compare the face sizes of a subject, automatically change an aperture value, and photograph the subject. When the plurality of detected face regions are in a long distance, for example, in a case for obtaining an out-focusing effect by focusing a focal point only on a main subject, the control unit 210 compares face sizes or an interval between eyes. When a difference between the face size of the main subject and the face sizes of other subjects is large, the control unit 210 may determine that the user intends to obtain an out-focusing effect and allow an input image to be captured with a currently-set aperture value.

Figure 6:
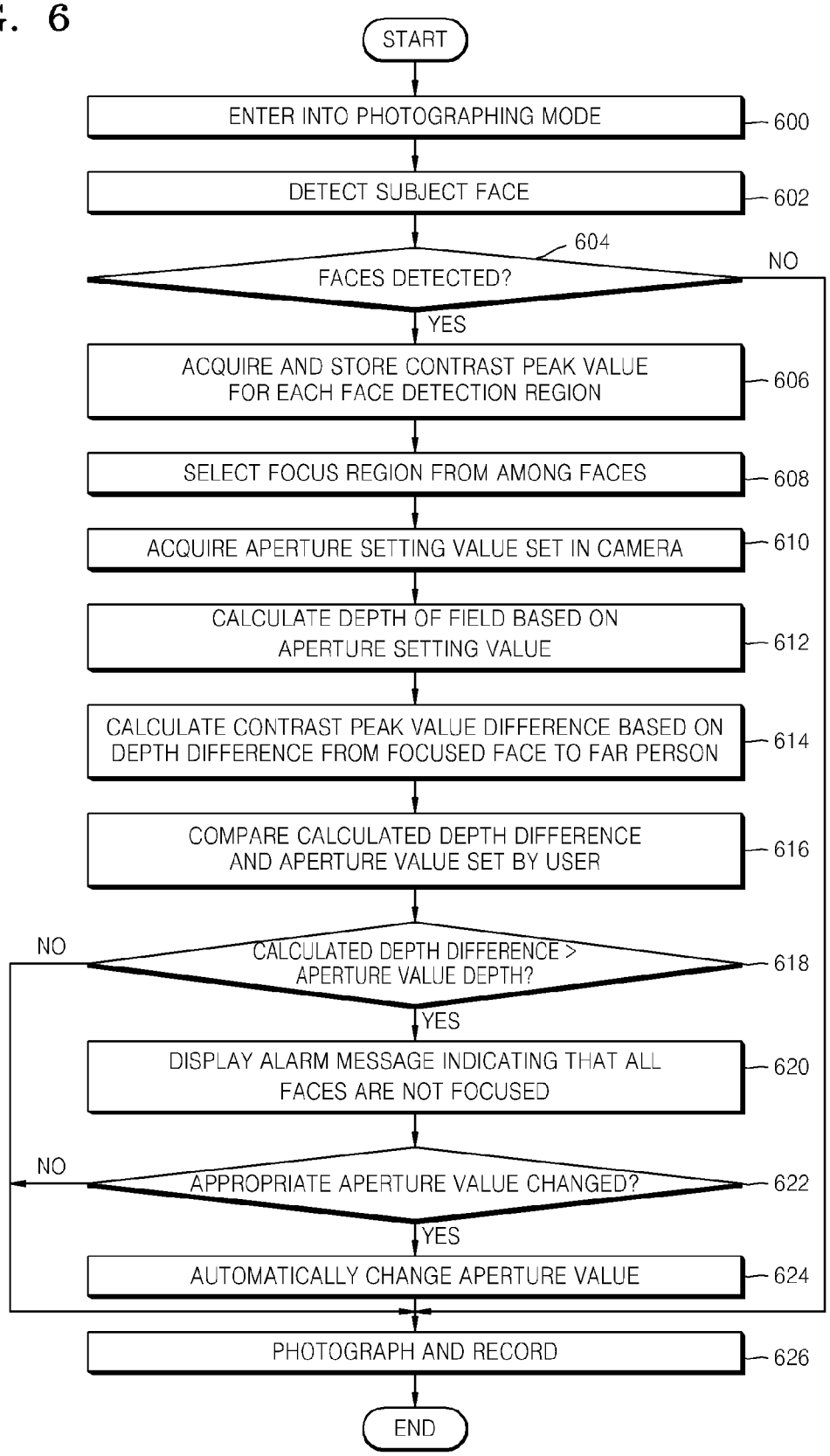
FIG. 6 is a flowchart that illustrates a method of controlling a digital photographing apparatus, according to an embodiment.

FIG. 6 is a flowchart that illustrates a method of controlling a digital photographing apparatus, according to an embodiment.

Referring to FIG. 6, the digital camera enters into a photographing mode in operation 600. Herein, the photographing mode denotes an aperture value auto change mode, and it may allow a user to select one of aperture value auto change on, aperture value auto change off, and aperture value auto change guide. The digital camera detects a subject face from an input image in operation 602. The digital camera determines whether a plurality of faces have been detected in operation 604. Generally, when one face is detected from an input image, AF and AE may be performed on a corresponding face.

If a plurality of faces have been detected in operation S604, the digital camera acquires and stores a contrast peak value for each face detection region in operation 606. Herein, the contrast peak value is the location of a focus lens or an AF value that may be obtained by performing AF. The digital camera selects a focus region from among the plurality of faces in operation 608. Herein, when selecting a focus region, a specific face region may be selected according to a user's request or setting of the digital camera.

The digital camera acquires an aperture setting value that has been set in the digital camera in operation 610. Aperture setting may be manually performed by the user, and an aperture value may be automatically set through AE after light metering. The digital camera calculates a depth of field based on an aperture setting value in operation 612. The digital camera calculates a contrast peak value difference based on a depth difference to a person far away from a focused face in operation 614. The digital camera compares the calculated depth difference and a depth based on an aperture value that is set by the user in operation 616. Herein, it has been described above that the user sets the aperture value, but the digital camera may include an automatically-set aperture value.

If the calculated depth difference is greater than the depth based on the set aperture value in operation 618, the digital camera proceeds to operation 620 and displays an alarm message indicating that all faces are not focused. That is, since all faces are not focused with light that is input through an aperture according to the set aperture value when the calculated depth difference is greater than the depth based on the set aperture value, this is notified to the user.

The digital camera inquires whether to change to an appropriate aperture value of the user in operation 622. Herein, the digital camera confirms whether to change the set aperture value to an aperture value based on a depth difference to the user, and when change is confirmed by the user, the digital camera automatically changes the aperture value in operation 624. Herein, the changed aperture value is an aperture value enabling depth expression of all faces that exist in the input image according to the calculated depth difference. For example, the changed aperture value is an aperture value that allows even the farthest face to be focused. The digital camera captures the input image with the changed aperture value and records the captured image in operation 626.

Herein, although operations 620 and 622 have been described above, operations 620 and 622 may be omitted depending on the case. In this case, when the calculated depth difference is greater than the depth based on the set aperture value, the digital camera may proceed to operation 624 and automatically change to a corresponding aperture value.

Otherwise, if the calculated depth difference is less than a depth based on the set aperture value in operation 618, the digital camera proceeds to operation 626, captures the input image with the currently-set aperture value and records the captured image. In operation 622, moreover, in a case where the digital camera confirms whether to change to an appropriate aperture value to the user, the user may ignore a change request when a current aperture setting value is required by the user. At this point, the digital camera proceeds to operation 626, captures the input image with the current aperture setting value and records the captured image.

Therefore, when there area plurality of persons in photographing of a subject, the digital camera detects the faces of the subject, automatically calculates an aperture value for focusing on all the faces, informs the calculated aperture value of the user, automatically changes to the calculated aperture value, and photographs the subject in order for all the faces to be focused.

Figure 7:
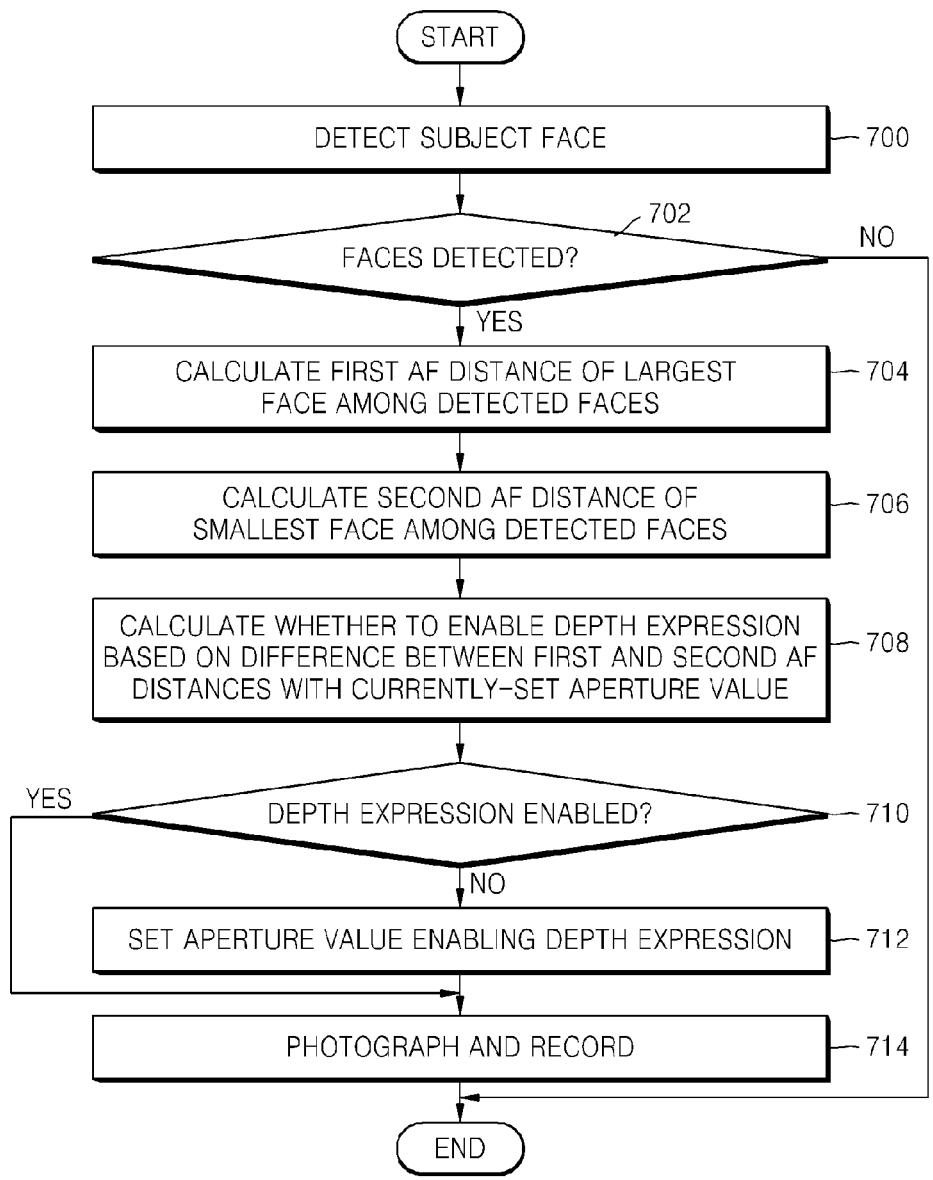
FIG. 7 is a flowchart that illustrates a method of controlling a digital photographing apparatus, according to another embodiment.

FIG. 7 is a flowchart that illustrates a method of controlling a digital photographing apparatus, according to another embodiment.

Referring to FIG. 7, a digital camera detects a subject face from an input image in operation 700. If a plurality of faces are determined to be detected in operation 702, the digital camera proceeds to operation 704. The digital camera calculates a first AF distance of the largest face region in the detected faces in operation 704. The digital camera calculates a second AF distance of the smallest face region in the detected faces in operation 706. Herein, the first and second AF distances are distances from the digital camera to a subject corresponding to the detected face, and they may be calculated using an AF value.

The digital camera calculates whether to enable depth expression by a difference between the first and second AF distances with a currently-set aperture value in operation 708. If it is determined to be possible to perform depth expression in operation 710, the digital camera proceeds to operation 714, photographs the subject with the currently-set aperture value and records the photographed subject.

Otherwise, if it is determined to be impossible to perform depth expression in operation 710, for example, if it is impossible to focus on the smallest face with the currently-set aperture value, the digital camera sets an aperture value enabling depth expression in operation 712. The digital camera photographs the subject with the aperture value that is set in operation 712 and records the photographed subject.

Figure 8A:
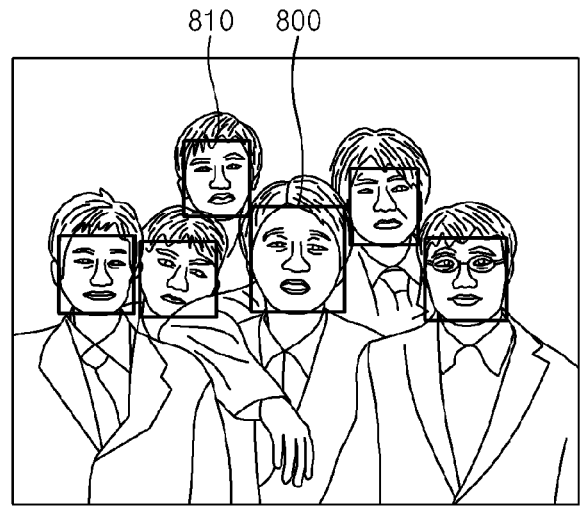
FIGS. 8A, 8B, 8C, and 9 are exemplary images for describing the method of controlling the digital photographing apparatus in FIG. 7.
Figure 8B:
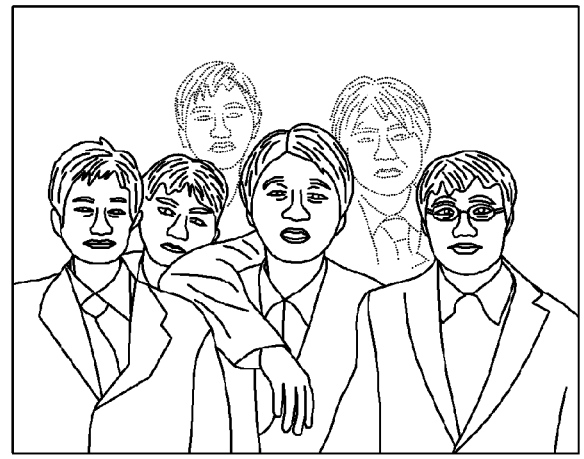
Figure 8C:
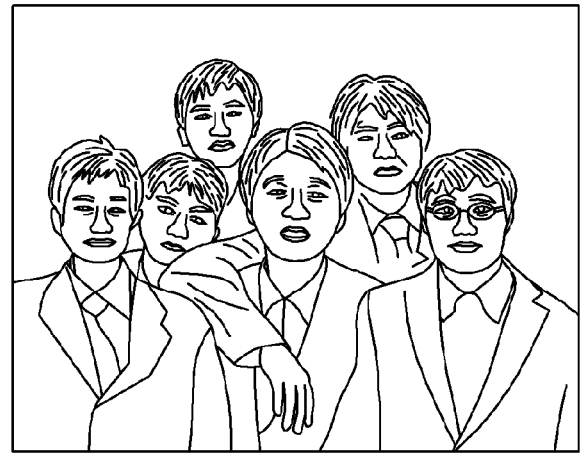
Figure 9:
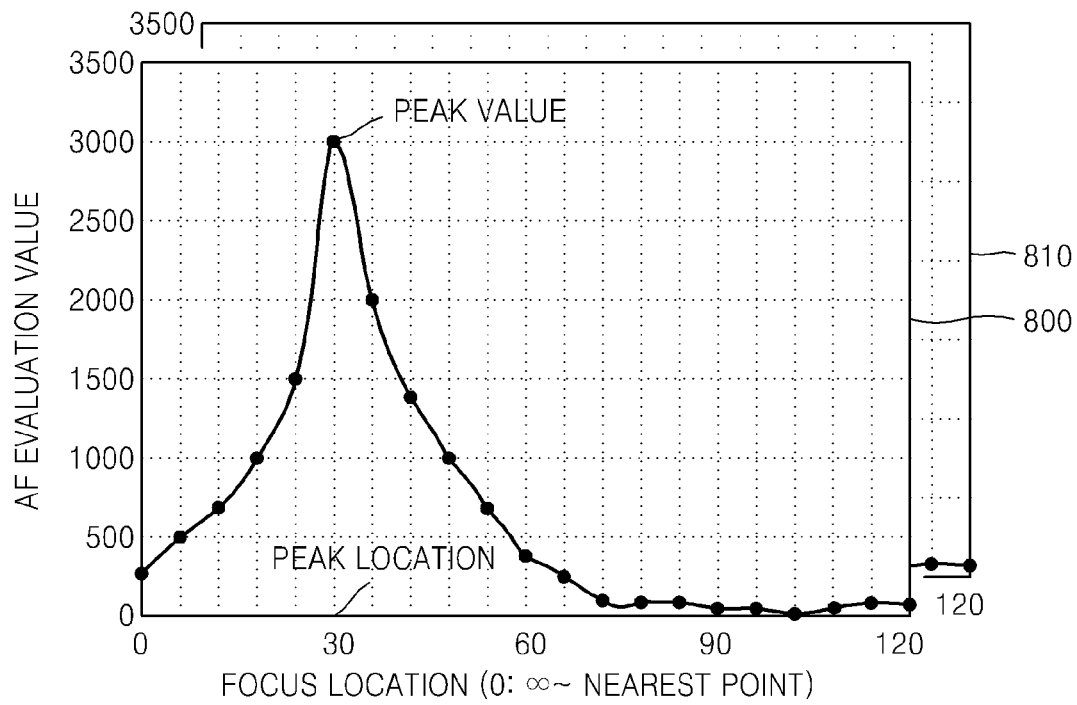

FIGS. 8A, 8B, 8C, and 9 are exemplary images for describing the method of controlling the digital photographing apparatus in FIG. 7. Referring to FIGS. 8A to 8C and 9, as illustrated in FIG. 8A, when a plurality of faces are detected from an input image, the digital camera calculates AF distances on a largest face region 800 and a smallest face region 810. In FIG. 9, it is illustrated that the digital camera performs an AF calculation on the largest face region 800 and the smallest face region 810. As illustrated in FIG. 9, the digital camera calculates distances to subjects pertaining to a corresponding face by using an AF value that has been calculated on each of the faces of the largest face region 800 and a smallest face region. Calculating a distance with an AF value is as described above with reference to FIGS. 3 and 4.

The digital camera compares a depth based on a currently-set aperture value and a depth based on each distance difference to determine whether the digital camera may focus on all faces existing in an input image and capture the input image. If it is impossible to perform depth expression, the digital camera changes to an appropriate aperture value and captures the input image.

An image of FIG. 8B is a result image where far faces are not focused and thus have been blurredly captured because the digital camera performs photographing with the currently-set aperture value, for example, f/2.8. An image of FIG. 8C is a result image that all far faces are focused and thus have been clearly captured when the digital camera changes the currently-set aperture value to an appropriate aperture value (for example, f/8.0) through the above-described aperture value auto change and performs photographing.

In the embodiments that have been described above with reference to FIGS. 7 to 9, since the digital camera does not calculate distances on all face regions that exist in the input image, the digital camera can change an aperture value at a higher speed. Herein, it has been described above that the digital camera calculates distances on the largest face and the smallest face, but this should not be construed as limiting. It is apparent that the digital camera may sequentially calculate distances in order of increasing size among a focused face and other faces, and calculate a depth difference.

The digital photographing apparatus and the control method thereof according to the embodiments detect the face of a subject, automatically calculate an aperture value for focusing on all faces to notify a user of the calculated value, and photograph all focused faces by automatically changing the aperture value, when the subjects to be photographed are persons.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling a digital photographing apparatus, the method comprising:
    detecting two or more face regions from an input image, wherein the two or more face regions include a first face region corresponding to a first subject and a second face region corresponding to a second subject;
    calculating a first distance to the first subject and a second distance to the second subject;
    calculating a first depth value as a depth difference based on the first and second distances;
    comparing the first depth value and a second depth value based on a current aperture value of the digital photographing apparatus to determine whether the first and second face regions of the input image are focused;
    when the first depth value is greater than the second depth value, confirming whether to change the current aperture value to a changed aperture value corresponding to the first depth value;

controlling capturing of the input image according to the confirmation.

2. The method of claim 1, wherein controlling capturing comprises changing the current aperture value to the changed aperture value.

3. The method of claim 1, wherein:
calculating the first and second distances comprises calculating the first and second distances by using auto-focus (AF) values for the first and second face regions;
wherein the first face region is a focused face region and the second subject corresponds to a farthest subject from the first subject.

4. The method of claim 1, wherein confirming comprises outputting an alarm message indicating that the first and second face regions of the input image are not focused.

5. The method of claim 1, wherein controlling capturing comprises:
automatically changing the current aperture value to the changed aperture value based on an aperture value auto change mode of the digital photographing apparatus; and
capturing the input image using the changed aperture value.

6. The method of claim 1, wherein controlling capturing comprises:
determining whether to change the current aperture value to the changed aperture value according to a user's selection; and
capturing the input image using the current aperture value or the changed aperture value according to the user's selection.

7. The method of claim 1, further comprising: selecting a largest face region of the two or more face regions as the first face region and a smallest face region of the two or more face regions as the second face region.

8. The method of claim 1, further comprising:
comparing a size of the first face region and a size of the second face region; and
capturing the input image using the changed aperture value based on the comparison of the sizes when a difference between the size of the first face region and the size of the second face region is equal to or greater than a first critical value.

9. The method of claim 1, further comprising changing the current aperture value in proportion to sizes of the first and second face regions when a distance to the first subject is equal to or less than a first critical value.

10. The method of claim 1, further comprising selecting one of aperture value auto change function on, aperture value auto change function off, and aperture value auto change function guide according to a user's selection.

11. The method of claim 1, wherein comparing the first depth value and the second depth value comprises determining the second depth value based on a depth of field table lookup using the current aperture value.

12. A non-transitory computer readable storage medium having stored thereon a computer program executable by a processor for performing a method of controlling a digital photographing apparatus, the method comprising:
detecting two or more face regions from an input image, wherein the two or more face regions include a first face region corresponding to a first subject and a second face region corresponding to a second subject;
calculating a first distance to the first subject and a second distance to the second subject;
calculating a first depth value as a depth difference based on the first and second distances;
comparing the first depth value and a second depth value based on a current aperture value of the digital photographing apparatus to determine whether the first and second face regions of the input image are focused;
when the first depth value is greater than the second depth value, confirming whether to change the current aperture value to a changed aperture value corresponding to the first depth value;
controlling capturing of the input image according to the confirmation.

13. A digital photographing apparatus comprising:
a face detection unit that detects two or more face regions from an input image, wherein the two or more face regions include a first face region corresponding to a first subject and a second face region corresponding to a second subject;
an auto-focus (AF) calculation unit that calculates a first distance to the first subject and a second distance to the second subject; and
a control unit that calculates a first depth value as a depth difference based on the first and second distances;
wherein the control unit compares the first depth value and a second depth value based on a current aperture value of the digital photographing apparatus to determine whether the first and second face regions of the input image are focused;
wherein when the first depth value is greater than the second depth value, the control unit confirms whether to change the current aperture value to a changed aperture value corresponding to the first depth value; and
wherein the control unit controls capturing of the input image according to the confirmation.

14. The digital photographing apparatus of claim 13, wherein:
the AF calculation unit calculates the first and second distances by using AF values for the first and second face regions, and
the control unit changes the current aperture value to the changed aperture value for capturing the input image.

15. The digital photographing apparatus of claim 13, further comprising an alarm unit that outputs whether the first and second face regions of the input image are focused,
wherein the alarm unit outputs an alarm message indicating that the first and second face regions of the input image are not focused to confirm whether to change the current aperture value.

16. The digital photographing apparatus of claim 13, wherein when the first depth value is greater than the second depth value, the control unit automatically changes the current aperture value to the changed aperture value based on an aperture value auto change mode of the digital photographing apparatus, and facilitates the input image to be captured using the changed aperture value.

17. The digital photographing apparatus of claim 13, wherein the control unit determines whether to change the current aperture value to the changed aperture value according to a user' selection, and facilitates the input image to be captured using the current aperture value or the changed aperture value according to the user's selection.

18. The digital photographing apparatus of claim 13, wherein the control unit selects a largest face region of the two or more face regions as the first face region and a smallest face region of the two or more face regions as the second face region.

19. The digital photographing apparatus of claim 13, further comprising a user mode selection unit that selects one of aperture value auto change function on, aperture value auto change function off, and aperture value auto change function guide.

20. The digital photographing apparatus of claim 13, wherein:
   the control unit determines the second depth value based on a depth of field table lookup using the current aperture value.

* * * * *